United States Patent Office 3,790,495
Patented Feb. 5, 1974

3,790,495
PROCESS FOR THE MANUFACTURE OF
COLLOIDAL FIBROUS BOEHMITE
Ernst Podschus, Leverkusen, Germany, assignor to Bayer Aktiengesellschaft, Leverkusen, Germany
No Drawing. Filed Jan. 31, 1972, Ser. No. 222,388
Claims priority, application Germany, Feb. 3, 1971,
P 21 04 897.5
Int. Cl. B01j 13/00
U.S. Cl. 252—313 R        6 Claims

ABSTRACT OF THE DISCLOSURE

The present invention relates to a process for the production of colloidal fibrous boehmite [AlO(OH)] wherein active aluminum oxide having a residual water content of from 2 to 15% by weight obtained by incomplete dehydration of hydrargillite is reacted in an aqueous slurry with a monobasic organic acid to give the corresponding basic Al-salt and subsequently said basic Al-salt is subjected to hydrothermal treatment at 120–200° C. and 2–15 atmosphere pressure in an aqueous suspension having a concentration of from 2 to 20% by weight of $Al_2O_3$ until a colloidal fibrous boehmite solution has been formed.

---

The present invention relates to a process for the manufacture of fibrous boehmite from active aluminum oxide.

Processes are already known by which basic aluminum salts in aqueous solution are converted into fibrous boehmite, AlO(OH) by an autoclave treatment. Under suitable conditions, colloidal solutions of boehmite in concentrations of between a few percent and up to about 20%, relative to $Al_2O_3$, are produced. The primary particles of the fibrous boehmite generally have a length of a few 100 millimicrons, with diameters of only a few millimicrons. The specific BET surface area, determined after drying, is in the range of 200–400 m.$^2$/g.

Starting products which under autoclave treatment are converted into fibrous boehmite are those aluminum hydroxides or basic salts which dissolve easily in acids. According to a test which has been described, half the starting material should dissolve in excess strong acid at 98° C. within one minute.

Such a starting material is, for example, the basic aluminum chloride of approximate composition $$Al_2(OH)_5Cl.aq,$$

which is amorphous to X-rays, and which can be obtained by introducing Al metal powder into boiling $AlCl_3$ solution. On the other hand, the reaction of $AlCl_3$ solution with aluminum oxide or aluminum hydroxide does not lead to highly basic salts.

Another suitable starting product is a basic Al carbonate precipitated from aluminum sulphate solution by means of sodium carbonate solution, which is carefully washed and then reacted with acetic acid or formic acid to give a basic salt which is then, as a solution, subjected to the hydrothermal treatment.

The known processes are rather expensive from the point of view of the starting product, since it is necessary to start from aluminum metal and from Al salts and to manufacture the suitable basic compounds therefrom. The precipitation of a reactive basic carbonate or hydroxide which filters with relative difficulty is involved.

The present invention relates to a process for the manufacture of colloidal fibrous boehmite, AlO(OH), by heating aqueous suspensions of sparingly soluble basic aluminum salts of monobasic acids under hydrothermal conditions to temperatures of 120–200° C. and pressures of 2 to 15 atmospheres, characterized in that active aluminum oxide having a residual water content of 2–15%, preferably 3–10%, which has been obtained by incomplete dehydration of hydrated alumina, is reacted in an aqeous slurry with monobasic organic acids to give the corresponding basic Al salt and the resulting basic Al salt is subsequently subjected to the hydrothermal treatment in aqueous suspension at a concentration of 2–20% of $Al_2O_3$, until the colloidal fibrous boehmite solution has been formed.

In fact, it has been found that colloidal solutions of fibrous boehmite can be obtained relatively simply and economically by starting from active aluminum oxide which is obtained by incomplete dehydration of Bayer hydrated alumina and converting the latter, by means of acetic acid or formic acid in a molar ratio of

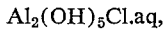

Al/acid=1/0.5–3, preferably 1/1–2, by several hours' heating to the boil with reflux cooling and stirring, into the sparingly soluble basic salt which is thereafter subjected to the autoclave treatment in an aqueous slurry at a concentration of 2–20% of $Al_2O_3$.

The starting material is thus the partially dehydrated active aluminum oxide which is obtainable in a simple manner from hydrated alumina, hydrargillite, a cheap large-scale product. It is particularly advantageous to use an active aluminum oxide which, according to another proposal, is obtained by rapid incomplete dehydration of Bayer hydrated alumina in a highly turbulent stream of gas at 400–800° C. and which still possesses a residual water content of, preferably, 3–10%, a specific BET surface area of at least 250 m.$^2$/g. and a water absorbency, at 50% relative humidity, of more than 10%. A device such as described in U.S. patent specification 3,021,195 is very suitable for the manufacture of such an aluminum oxide. The hydrated alumina is dusted into the axial back-flow of a spirally ascending or descending stream of hot gas and leaves the conically shaped calcining chamber at 400–800° C. at the larger diameter end, together with the stream of gas, after which the aluminum oxide is separated off in customary devices, such as, for example, cyclones. The manufacture of such a highly active aluminum oxide is very simple and economical, especially if the waste heat of the stream of gas is also utilized. The amount of product in the gas stream is relatively high. Combustion gases which are produced from gas or oil in a preceding burner serve as the hot gas. With an inlet temperature of 1,000° C. and an outlet temperature of 580° C., for example, the gas stream (calculated relative to normal conditions) is charged with approximately 200 g. of hydrated aluminum oxide/m.$^3$. At higher inlet temperatures, which are technically possible without difficulty, and/or lower outlet temperatures, the throughput is correspondingly higher.

The conversion of the hydrargillite into the active oxide of disturbed crystallinity with an indication of the X-ray interferences of the Chi-$Al_2O_3$ takes place pseudomorphously. The particle size and shape remain preserved. The bulk density decreases by the amount of water of hydration which is split off, for example from a density, when compacted by tapping, of 1.410 g./l. for the starting product to 1.035 g./l. for an active aluminum oxide with 5.8% residual water content (loss on ignition).

If the active aluminum oxide, in an aqueous slurry, is heated with acetic acid or formic acid in the molar ratio of Al/acid=1/0.5–3, gradual conversion of the oxide takes place with hydration and salt formation, and is detectable, through titration of samples, because of the decrease in the acid content in the filtrate. Furthermore, the mixture becomes whiter and more viscous through the formation of finer particles. Appropriately, the mixture is heated to the boil under reflux, while stirring, and the $Al_2O_3$ concentration is so chosen that the mixture remains stirrable despite the increase in viscosity. The conversion into the basic salt takes place more rapidly at a higher acid/Al$_2$O$_3$ ratio than at a lower ratio, and takes place more rapidly with formic acid than with acetic acid. On evaporation, the bulk of the acid can be recovered from the colloidal fibrous boehmite solution formed in the next stage, the autoclave treatment. The basic Al salt formed is distinguished by its own characteristic X-ray diagram which is largely independent of the Al/acid ratio. The strongest interferences of the basic Al acetate are: 7.06; 6.27; 4.57; 3.90 and 3.37. Comparison experiments with hydrated alumina showed virtually no reaction on being treated with acid for the same times.

Though the formation of the basic Al salt, according to the filtrate acid titration test and according to the existence of the X-ray diagram, takes place relatively rapidly within a few hours, it is advisable, for the subsequent formation of colloidal fibrous boehmite, to continue the treatment until the mixture has assumed a viscous character resembling whipped cream.

For the hydrothermal treatment, the mixture containing the sparingly soluble basic Al salt can be employed as such, if appropriate after suitable dilution with water, or the basic salt can be isolated by filtration and washing and the fresh slurry in water employed in the autoclaves. The filtrate, which contains a part of the acid and a relatively small proportion of Al, can be introduced in the next batch—made up with fresh acid or with acid obtained by distillation from the boehmite solution.

The conversion into colloidal, fibrous boehmite can be carried out in an autoclave or, in a manner which is in itself known, in a pressure flow apparatus at temperatures of about 120–200° C., appropriately at 140–180° C. The concentration of the suspension of the basic Al salt is appropriately so adjusted that a high space-time yield is achieved but it still remains possible to stir or pump the mixture and a stable, colloidal suspension is produced.

The desired particle size of the fibrous boehmite is achieved by selecting the temperature-time conditions of the hydrothermal treatment. Unreacted starting product or excessively coarse boehmite material, which sediments or is separated out from the boehmite sol on centrifuging, can appropriately be recycled to the process for the manufacture of the intermediate product, in which it is heated with the monobasic acid and converted into the starting material, the basic salt. The proportion of excessively coarse material separated out from the sol is between a few percent and up to about 20% of the total amount, depending on the manufacturing conditions.

The proportion of acid in the fibrous boehmite can be reduced in various ways. It is particularly advantageous to spray dry the sol under such conditions that no elimination of the water of hydration as yet occurs. The spray-dried product can be re-dispersed in water to give a sol which contains less acid per Al$_2$O$_3$ and hence has a higher pH-value.

Colloidal fibrous boehmite solutions differ from sols of the highly basic aluminum chloride, which is known as the starting material for the manufacture of boehmite, and from silica sols inter alia through the fact that on drying the solutions form firmly-adhering, solid films, for example on glass, while the sols with isotropic particles after drying yield gels which easily flake off and break up into dust. This property of the fibrous boehmite results in numerous fields of use such as, for example, ceramic binders, textile auxiliaries, fillers and other binder for refractory materials for the shaped catalysts and for rock wool insulation, antisoiling and soil release agent for carpets, and filler for rubber articles manufactured from latices.

The process according to the invention is explained below with the aid of examples:

EXAMPLE 1

1270 g. of active aluminum oxide showing 6.35% loss on ignition, obtained by rapid heating of Bayer hydrated alumina in a turbulent stream of hot gas, and corresponding to 1,190 g. of Al$_2$O$_3$, were mixed with glacial acetic acid and water in a three-neck flask equipped with a stirrer and reflux condenser. In 4 trial batches, the Al/acetic acid molar ratio was set to 1:1, 1:1.5, 1:2 and 1:3, and the volume of the batch was in each case made up to 5.5 l. with water. The batches were then heated to the boil while stirring. The consumption of acetic acid after various times was determined by taking a sample and titrating the filtrate.

| Experiment No. | Starting material | Al/Ac | Duration of reaction, hours | Percent of acetic acid employed found in the filtrate |
|---|---|---|---|---|
| 1 | Active Al$_2$O$_3$ | 1/3 | 9 | 45 |
| 2 | Hydrated alumina | 1/3 | 9 | ~100 |
| 3 | Active Al$_2$O$_3$ | 1/2 | 1.5 | 54 |
|   | do | 1/2 | 18 | 14 |
| 4 | do | 1/1.5 | 6.5 | 5 |
|   | do | 1/1.5 | 19 | 2 |
| 5 | do | 1/1 | 1.5 | 4 |
|   | do | 1/1 | 19 | 1.5 |

Understandably, the more acetic acid is available, the more is incorporated into the sparingly soluble acetate. The solid which is filtered off however always shows the X-ray diagram of the basic acetate, with the abovementioned interferences, independently of the Al/Ac ratio. Use of the starting material, Bayer hydrated alumina, instead of active aluminum oxide does not lead to any significant formation of basic acetate after 9 hours.

Batches 3, 4 and 5 were made up to 24 l. with water after boiling for 24 hours, that is to say brought to a concentration of approximately 5% Al$_2$O$_3$. The suspension was homogenized for some minutes with an efficient stirrer and was heated for 5 hours to 160° C. in a 30 l. stirred autoclave made of stainless steel. Thereafter, over 50% of the Al$_2$O$_3$ employed were present as colloidal fibrous boehmite solution in all cases.

What I claim is:

1. In a process for the production of colloidal fibrous boehmite [AlO(OH)] by reacting an aluminum compound in an aqueous slurry with formic acid or acetic acid in an Al:acid molar ratio of 1:0.5 to 1:3 to give the corresponding basic Al salt and subsequently subjecting said basic Al salt to hydrothermal treatment at 120 to 200° C. and 2 to 15 atmospheres pressure in an aqueous suspension having a concentration of from 2 to 20% by weight of Al$_2$O$_3$ until a colloidal fibrous boehmite solution has been formed, the improvement which comprises using as said aluminum compound an active aluminum oxide obtained by incomplete dehydration of hydrargillite, said aluminum oxide having a residual water content of from 2 to 15% by weight, a specific BET surface area of at least 250 m.$^2$/g. and a water absorbency, at 50% relative humidity, of more than 10%.

2. A process according to claim 1, wherein said active aluminum oxide has a residual water content of from 3 to 10% by weight.

3. A process according to claim 1, wherein said active aluminum oxide is obtained from hydrargillite by rapid dehydrated in a turbulent stream of gas at a temperature of from 400–800° C.

4. A process according to claim 1, wherein the reaction of said active aluminum oxide and said formic or acetic acid involves heating a mixture thereof to the boil until no further increase in viscosity occurs.

5. A process according to claim 1, wherein said colloidal fibrous boehmite solution is thickened by evaporation fhile reducing the acid:$Al_2O_3$ ratio and the boehmite is converted by drying into a powder which still contains water of hydration and gives a colloidal solution in water.

6. A process according to claim 1, wherein said colloidal fibrous boehmite solution is spray-dried after evaporation and the boehmite containing water of hydration is re-suspended in water.

References Cited
UNITED STATES PATENTS

| | | | |
|---|---|---|---|
| 2,915,475 | 12/1959 | Bugosh | 252—313 R |
| 3,031,417 | 4/1962 | Bruce | 252—313 R |
| 3,056,747 | 10/1962 | Arthur, Jr. | 252—313 R |
| 3,207,578 | 9/1965 | Brown et al. | 252—313 RX |

RICHARD D. LOVERING, Primary Examiner

U.S. Cl. X.R.

106—287 R, 288 B; 252—317; 423—626